June 23, 1953     C. L. CUMMINGS     2,642,756
ROTATABLE CHANGE SPEED DEVICE
Filed Dec. 1, 1951
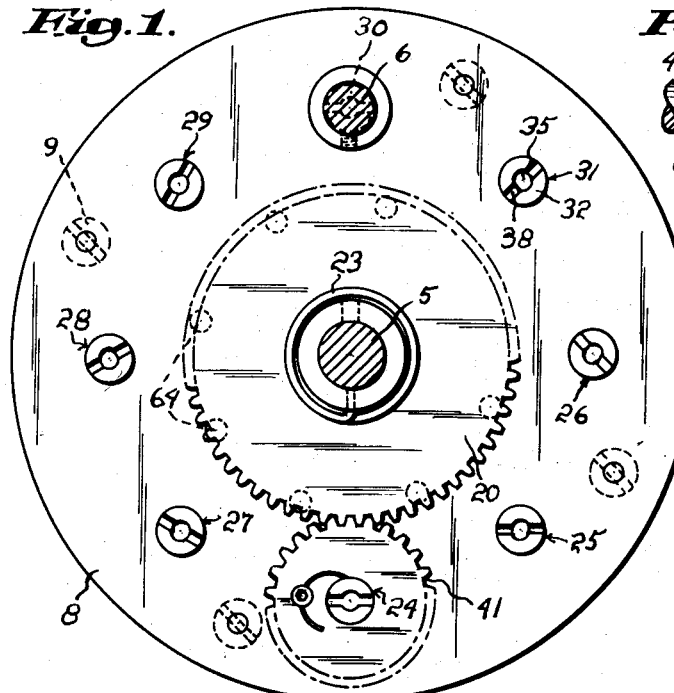
Inventor:
Clinton L. Cummings,
by
Attorney Patented June 23, 1953

2,642,756

UNITED STATES PATENT OFFICE 2,642,756

ROTATABLE CHANGE SPEED DEVICE

Clinton L. Cummings, Natick, Mass.

Application December 1, 1951, Serial No. 259,369

7 Claims. (Cl. 74—665)

This invention relates to a rotary change speed device to connect parallel drive and driven shafts.

While such devices are adapted to a variety of uses, they are particularly well suited for service in interconnecting the drive and driven shafts of the chart drives of recording instruments. In such instruments, it is frequently necessary to change the ratio of the chart drive and the objectives of this invention are to furnish a device that enables such ratio changes to be quickly, easily and accurately effected and at the same time is of a simple construction ensuring manufacturing efficiency and economy and reliability of service.

In accordance with the invention, the device comprises a gear casing connected to the drive shaft of the instrument for rotation independently thereof and for axial movement relative thereto between inner and outer positions. The casing is provided with a plurality of driven shafts with their axes so spaced from the casing axis that each may be positioned in axial alinement with the driven shaft of the instrument as the casing is turned on its axis. The instrument driven shaft and each of the casing driven shafts include complementally portions axially engageable when the casing is in its inner position. A gear train connects each of the casing driven shafts to each other to rotate those at different relative speeds and means are employed to connect that train to the drive shaft of the instrument only when the casing is in its inner position. Preferably such means yieldably maintain the casing in its inner position so that it is only necessary for the operator to pull the casing axially and then turn it until the driven shaft affording the desired ratio is axially alined with the driven shaft of the instrument. Upon release of the casing, the shafts of the instrument are again automatically connected.

The invention also provides that the gear casing includes front and rear walls detachably assembled in spaced relationships. The driven shafts have axial bores and are rotatably supported by the rear casing wall through which they extend and by studs carried by the front wall to enter their bores. Fast on each driven shaft is at least one gear. The idler gears are mounted on shafts that are rotatably supported by the rear casing wall through which they extend and by studs carried by the front wall to enter their bores. By this construction, the casing walls may be disconnected so that the gears are exposed and supported only by the studs by which they are slidably supported.

In the accompanying drawings, there is shown an illustrative embodiment of the invention from which these and other of its novel features and advantages will be readily apparent.

In the drawings:

Fig. 1 is a view of the change speed device as viewed from its rear end,

Fig. 2 is a vertical section thereof, and

Fig. 3 is a view, similar to Fig. 1, but with the rear wall removed.

The embodiment of the invention shown in the drawings is primarily intended for use in enabling the ratio between the parallel drive and driven shafts, indicated at 5 and 6, respectively, of a chart drive of a recording apparatus to be quickly, easily, and accurately changed.

The gear casing of the change speed device consists of circular walls or plates 7 and 8 constituting, respectively, its front and rear walls. These walls are interconnected as by posts 9 carried by the rear wall 8 adjacent its periphery, which posts serve as spacers and are internally threaded to receive assembly screws 10 extending through the front wall 7. These posts are shown in Fig. 3 for purposes of clarity, although as above indicated they are fast on the rear wall 8.

A spindle unit rotatably supports the gear casing and is shown as including a spindle 11 and a sleeve 12, both axially entrant of the gear casing with the sleeve 12 rotatably supporting the rear wall 8 and terminating short of the free end of the spindle 11. The spindle 11 supports the front casing wall 7 and the sleeve 12 for independent rotation and its protruding end is of sufficient length to serve as an axial support along which the sleeve 12 may be slid an appreciable distance. The spindle 11 has an enlarged hub 13 adapted to receive within it the exposed end of the drive shaft 5 and to be locked thereto as by the set screw 14.

The sleeve 12 has an end part 15 of substantially the same diameter as that of the spindle hub 13 and shoulders 16 and 17 providing an intermediate sleeve part 18. The sleeve 12 is dimensioned so that with the shoulder 16 in engagement with the outer surface of the wall 8, it engages the inner surface of the front wall 7 to provide an axial spacer therebetween. The gear casing is held against axial movement relative to the sleeve 12 by the collar 19 but is rotatable independently thereof. Fast on the intermediate sleeve part 18 is a main gear 20 which is seated against the shoulder 17.

Clutch means are provided to releasably couple the sleeve 12 to the spindle 11. As illustrative of such means, the face of the spindle hub 13 is shown as having bores 21 to receive pins 22, protruding from the adjacent face of the sleeve part 15, under the influence of the spring 23 anchored to the spindle hub 13 and to the sleeve part 15. As the casing and the sleeve are interconnected against independent axial movement, the coupling may be released by pulling the casing outwardly a short distance towards the free end of the spindle 11 from its inner position in which it is yieldably held by the spring 23.

The casing supports a plurality of driven shafts, generally indicated at 24, 25, 26, 27, 28, 29, 30, and 31. These are spaced from each other and so located that any one of them may be brought into axial alinement with the driven shaft 6 of the apparatus by turning the gear casing about its axis to the required extent when the clutch means are disengaged. Each such driven shaft includes a hub 32 (see Fig. 2) extending through and rotatably supported by the casing wall 8, a gear supporting part 33 terminating short of the casing wall 7 and an intermediate bearing flange 34 engageable with the casing wall 8. Each driven shaft has a bore 35 extending from end to end thereof and each of these receives a stud 36 carried by the front wall 7 and provided with a bearing flange 37 for the adjacent shaft end with the casing wall 7.

The exposed or hub end of each driven shaft has a transverse slot 38 to receive the transverse key 39 on the adjacent end of the adapter 40 locked on the exposed extremity of the driven shaft 6 of the instrument. The resilient connection between the spindle hub and the sleeve 12 ensures the mating of the adapter key 39 and the slot 38 of the axially alined casing driven shaft.

The shaft 24 has on its hub part 32 a gear 41 externally of the casing that is in mesh with the main gear 20 so that it is rotated at the ratio provided by those gears. The gear 41 locks its shaft 24 to the casing wall 8 while the remainder of the driven shafts are freely supported on their studs 36 and may be removed therefrom when the screws 10 are detached to enable the rear wall 8 to be removed.

In detailing the gear train, reference is made first to the shaft 24 which supports gears 42 and 43. (See Fig. 3.) There are a pair of gears 44 and 45 on the shaft 25 and a gear 46 on the shaft 26. An idler gear 47 meshes with the gears 42 and 44 and an idler gear 48 meshes with the gears 45 and 46.

The shaft 27 has a pair of gears 49 and 50 with the gears 43 and 49 meshing with the idler gear 51. Gear 50 on the shaft 27 meshes with the idler gear 52 and the driven shaft 28 includes gears 53 and 54 with the gear 53 meshing with idler 52. Fast on the driven shaft 29 are gears 55 and 56 with the gear 55 meshing with the idler 57 driven by gear 54. Gear 56 drives gear 58 fast on the shaft 30 through the idler 59 while gear 60 on the shaft 30 drives the gear 61 on the shaft 31 through idler 62.

Each of the idler gears is carried by an idler shaft 63 having a spindle end 64 rotatably supported by the rear casing wall 8 and having axial bores to enable them also to be supported by studs 36 carried by the front wall 7.

It will be understood that the gear train described rotates each casing driven shaft at a ratio different from the others and a greater or lesser number of ratio changes as well as a reverse drive may obviously be provided depending on the use to which the invention is to be put. The outer face of the casing wall is usually provided with indicia to indicate the ratio of its several driven shafts.

From the foregoing, it will be appreciated that ratio changers in accordance with the invention are well adapted to meet a wide range of requirements including those related to production, installation, and service.

What I therefore claim and desire to secure by Letters Patent is:

1. A rotatable change speed device for use in connecting parallel drive and driven instrument shafts, said device comprising a gear casing, means connecting said casing to said drive shaft for rotation independently thereof and for axial movement relative thereto between inner and outer positions, a plurality of driven shafts carried by said casing with their axes so spaced from the casing axis that each may be positioned in axial alinement with said instrument driven shaft as said casing is turned on its axis, complemental connecting means carried respectively by said instrument driven shaft and said casing driven shafts engageable when said casing is in its inner position, and a gear train to rotate each of said shafts at different speeds relative to each other, and means operatively connecting said gear train to said drive shaft when said casing is in its inner position.

2. A rotatable change speed device for use in connecting parallel drive and driven instrument shafts, said device comprising a gear casing, means connecting said casing to said drive shaft for rotation independently thereof and for axial movement relative thereto between inner and outer positions, a plurality of driven shafts carried by said casing with their axes so spaced from the casing axis that each may be positioned in axial alinement with said instrument driven shaft as said casing is turned on its axis, complemental connecting means carried respectively by said instrument driven shaft and said casing driven shafts engageable when said casing is in its inner position, and a gear train to rotate each of said shafts at different speeds relative to each other, and yieldable means engaging said casing in its inner position and operatively connecting said gear train to said drive shaft.

3. A rotatable change speed device for use in interconnecting parallel drive and driven shafts of an instrument, said device comprising a gear casing including front and rear walls interconnected in spaced relationship, a spindle to be connected to said drive shaft and extending axially through said casing, a sleeve rotatable and slidable on said spindle and entrant of said casing, means locking said casing to said sleeve for rotation independently thereof but for axial movement therewith, a resilient coupling between said sleeve and said spindle releasable by sliding said casing in said sleeve along said spindle away from said drive shaft, a main gear fast on said sleeve, a plurality of driven shafts carried by said casing with their axes so spaced from the axis of said main gear that each may be positioned in axial alinement with said instrument driven shaft as said casing is turned on its axis with said coupling released, a member attachable to said instrument driven shaft, each of said casing driven shafts and said member including complemental portions axially engageable when said coupling is engaged, a gear on one of said casing driven shafts in mesh with said main gear, and a gear train interconnecting said casing driven shafts to effect their rotation at different speeds relative to each other.

4. A rotatable change speed device for use in interconnecting parallel drive and driven shafts of an instrument, said device comprising a gear casing including front and rear walls interconnected in spaced relationship, a spindle to be connected to said drive shaft and extending axially through said casing and slidably supporting its front wall, a sleeve rotatable and slidable on said spindle and entrant of said casing and supporting its rear wall, means locking said casing to said sleeve for rotation independently thereof but for axial movement therewith, a resilient coupling between said sleeve and said spindle releasable by sliding said casing in said sleeve along said spindle away from said drive shaft, a main gear fast on said sleeve externally of said casing, a plurality of driven shafts carried by said casing with their axes so spaced from the axis of said main gear that each may be positioned in axial alinement with said instrument driven shaft as said casing is turned on its axis with said coupling released, a member attachable to said instrument driven shaft, each of said casing driven shafts and said member including complemental portions axially engageable when said coupling is engaged, a gear on one of said casing driven shafts externally of said casing in mesh with said main gear, and a gear train interconnecting said casing driven shafts to effect their rotation at different speeds relative to each other.

5. A rotatable change speed device for use in interconnecting parallel drive and driven shafts of an instrument, said device comprising a gear casing including front and rear walls interconnected in spaced relationship adjacent their peripheries, a spindle to be connected to said drive shaft and extending axially through said casing and slidably supporting said front wall, a sleeve rotatable and slidable on said spindle and entrant of said casing and supporting its rear wall and being of sufficient length to engage the inner surface of said front wall to serve as an axial spacer, means locking said casing to said sleeve for rotation independently thereof but for axial movement therewith, a resilient coupling between said sleeve and said spindle releasable by sliding said casing and said sleeve along said spindle away from said drive shaft, a main gear fast on said sleeve, a plurality of driven shafts carried by said casing with their axes so spaced from the axis of said main gear that each may be positioned in axial alinement with said instrument driven shaft as said casing is turned on its axis with said coupling released, a member attachable to said instrument driven shaft, each of said casing driven shafts and said member including complemental portions axially engageable when said coupling is engaged, a gear on one of said casing driven shafts in mesh with said main gear, and a gear train interconnecting said casing driven shafts to effect their rotation at different speeds relative to each other.

6. A rotatable gear casing including front and rear walls, spacers interconnecting said walls, a plurality of driven shafts rotatably supported by said rear wall and extending therethrough, said driven shafts being spaced from each other with their axes uniformly spaced from the casing axis, each of said driven shafts having an axial bore opening towards said front wall, studs slidably entrant of said driven shaft bores and carried by said front wall, a plurality of idler shafts having axial bores opening towards said front wall, a stud sliding entrant of each idler shaft bore and carried by said front wall, and gears fast on said shafts to establish a gear train effective to rotate each of said driven shaft at different speeds relative to each other.

7. A rotatable gear casing including front and rear walls, spacers interconnecting said walls, a plurality of driven shafts rotatably supported by said rear wall and extending therethrough, said driven shafts being spaced from each other with their axes uniformly spaced from the casing axis and including a flange engageable with the inner face of said rear wall, each of said driven shafts having an axial bore opening towards said front wall, a plurality of idler shafts rotatably supported by said casing rear wall and including shoulders engageable with the inner surface thereof, said idler shafts also having axial bores opening towards said front wall, a stud slidably entrant of each shaft bore and including a portion engageable with the adjacent end of that shaft, said studs being carried by said front wall, and gears fast on said shafts to establish a gear train effective to rotate each of said driven shafts at different speeds relative to each other.

CLINTON L. CUMMINGS.

References Cited in the file of this patent

UNITED STATES PATENTS

| Number | Name | Date |
|---|---|---|
| 1,728,279 | Ramsey | Sept. 19, 1929 |
| 1,778,432 | Ramsey | Oct. 14, 1930 |
| 2,549,493 | Kuhl | Apr. 17, 1951 |